April 16, 1968    M. DRODOFSKY    3,377,910
STABILIZED OPTICAL INSTRUMENT UTILIZING
BOX LEVEL BUBBLE AS LENS
Filed Feb. 13, 1964

United States Patent Office 3,377,910
Patented Apr. 16, 1968

3,377,910
STABILIZED OPTICAL INSTRUMENT UTILIZING BOX LEVEL BUBBLE AS LENS
Martin Drodofsky, Heidenheim, Wurttemberg, Germany, assignor to Carl Zeiss-Stiftung, doing business as Carl Zeiss, Heidenheim, Wurttemberg, Germany, a foundation of Germany
Filed Feb. 13, 1964, Ser. No. 344,598
Claims priority, application Germany, Feb. 15, 1963, Z 9,918
2 Claims. (Cl. 88—1)

ABSTRACT OF THE DISCLOSURE

A box level for an optical observation instrument, such as a telescopic sight or a reading microscope and used for automatic compensation of small inclinations, said box level comprising a closed liquid chamber filled with such a predetermined amount of liquid that the remaining bubble, which serves as an additional lens in the optical system, remains practically unchanged in size within a temperature range from about −10° C. to +40° C.

Figures 1, 2:
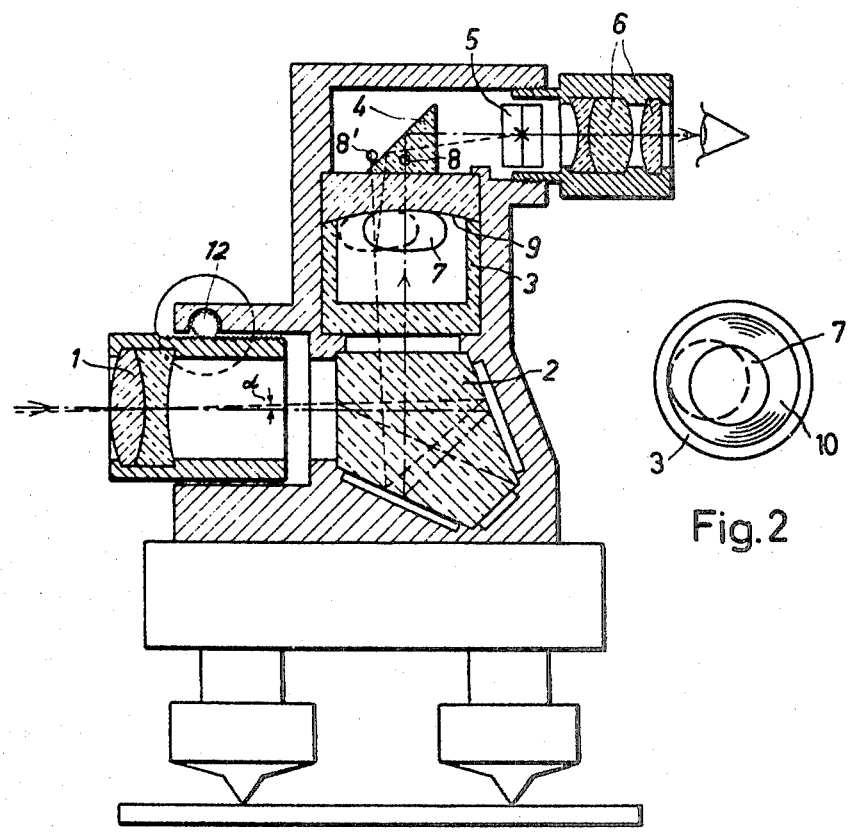

The invention relates to an optical instrument, particularly a telescopic sight or a reading microscope, which for the purpose of automatic compensation of small inclinations is provided with a box level and is so constructed that the means for projecting a target mark onto a reticle employs as dispersing lens the gas bubble of the level.

The optically effective faces of a gas bubble in a box level are formed on one hand by the constant or permanent inner face of the cover member of the box level, which inner face has a predetermined unchanging radius of curvature serving as the runway for the bubble, and on the other hand by the surface of the liquid which forms the boundary face of the bubble and constitutes the light admitting face.

It has been found that the optical enlargement of the image of the target mark projected by the level bubble onto the reticle varies when the temperature changes and this is not at all desirable.

The inventor has discovered that the selection of an optimum amount of liquid in the box level will produce an enlargement of the optical system containing the bubble which remains constant for all practical purposes within a relatively large temperature range.

This is indeed very surprising. A change in temperature causes also a change in the volume of the liquid in the level which change is about 30 times the amount of the volume variation of the box. This has the result that the shape of the bubble is changed and therewith the radius of curvature $r_7$ of the bubble is changed. Since furthermore the surface tension of the liquid changes when the temperature changes, the result is that also the size of the radius of the bubble is influenced. With such a change also the distance $w$ of the light admitting face of the bubble from the image on the reticle plate 5 is changed.

Finally, the temperature change causes also a change in the refractive index $n_7$ of the liquid in the level so that a number of changes take place on the lens formed by the level bubble to cause during a substantial change in the temperature a change in its focal length.

It would appear obvious to compensate for these changes in temperature by making the radius of curvature $r$ of the runway 9 of the level bubble inversely dependent upon the temperature. Indeed, the radius of curvature of the runway and the focal length $f_1$ of the objective are dependent upon the temperature. The influence of the expansion of the glass and the change in the index of refraction of the glasses from which the objective is made amount, however, to only 1/1000 to 1/100 of the influence of the temperature upon the bubble so that in this manner the desired aim is not attainable.

In accordance with the invention the desired independence of the temperature from the optical enlargement of the level bubble in the arrangement is obtained by determining either empirically or by calculating the optimum degree of filling the level box with liquid, in that over a temperature range of about −10° C. to +40° C. the optical enlargement $\beta$ will be constant with such an accuracy that it does not deviate more or less than 1% from the desired value.

A calculation requires the integration of the differential equation for the light admission surface of the level bubble.

The invention will now be described in greater detail with reference to the accompanying drawing which illustrates by way of example and diagrammatically one embodiment of the invention.

In the drawing:
FIG. 1 is a substantially vertical sectional view of the optical system of a telescopic sight and of the path of the light rays, and of a box level associated therewith, and
FIG. 2 is a top elevation view of the box level.

Referring to the drawing, the axially adjustable objective 1 projects by means of a pentaprism 2 and a box level 3 an image of the target point, which image without considering the optical effect of the level bubble would be projected to the location or point indicated with 8. Due to the axially symmetrical level bubble 7, which acts as a dispersion lens, the image of the target point is projected by the prism 4 onto the reticle 5 and is viewed sharply and clearly by the eye and the axially adjustable ocular 6 together with the scale lines on the reticle.

If now the telescopic sight is tilted about an axis by a small angle $\alpha$ in the plane of the drawing, then the originally horizontal main light beam assumes relatively to the instrument the position or path indicated in dash lines. The image of the target point would be displaced form 8 to 8' if the bubble in the level would remain unchanged. The amount of this lateral displacement would be $$d_1 = s \cdot \alpha$$

in which $s$ designates the image distance of the objective 1. However, at the same time the instrument is tilted about the angle $\alpha$, the bubble 7 travels the distance $$d_2 = r \cdot \alpha$$

in the same direction as the image 8.

The image distance $s$ of the objective 1 is dependent on the distance of the target point from the instrument according to the equation:

$$\frac{1}{s} = \frac{1}{f_1} - \frac{1}{E}$$

wherein $E$ is the distance of the target point from the instrument and $f_1$ is the focal length of the objective 1. For adjusting the instrument to different distances $E$, the objective 1 is axially adjusted for instance by the rack and pinion drive indicated with 12.

Since the enlargement $\beta$ is maintained constant, each inclination $\alpha$ of the instrument—when viewed from the objective 1—corresponds to a constant distance $a$ by which the reticle appears to be displaced. According to the well known observations concerning the anallactic point in telescopic sights, the forward focal point of the objective is the apparent tilting axis of the instrument.

The radius of curvature $r$ of the lower face 9 of the cover plate 10 forming a runway 9 for the bubble 7 in the level is selected to be of such a value that in spite of the inclination of the instrument the image of the target point is reflected by the prism 4 sharply into the center of the reticle plate 5. Such a radius of curvature is determined by the equation $$r = f_1 \frac{\beta}{\beta - 1}$$

wherein $f_1$ is again the focal length of the objective 1 and $\beta$ indicates the enlargement with which the image is projected onto the reticle plate 5.

The enlargement $\beta$ of the image appearing on the reticle 5 with the assistance of the bubble 7, the objective 1, the curved runway 9 of the level 3 and the prism 4 depends upon the focal length $f_7$ of the bubble and the distance $w$ between the light admitting face of the bubble and the reticle plate 5. It is:

$$\beta = \frac{f_7 - w}{f_7}$$

The focal length $f_7$ of the level bubble under consideration of the index of refraction $n_7$ of the liquid in the level is $$f_7 = \frac{r_7}{1 - n_7}$$

wherein $r_7$ is the length of the radius of curvature of the bubble at its deepest point.

The degree of filling the level is so adjusted that the quotient $$\beta = \frac{f_7 - w}{f_7}$$

will remain constant within a temperature range from at least $-10°$ to $+40°$ C. in such a manner that it does not deviate more than $\pm 1\%$ from the required value.

When the following dimensions are selected:

| | |
|---|---|
| $r$ | mm 404 |
| $f_1$ | mm 112 |
| $w$ | mm 16.4 |
| $n_7$ | 1.35 | the result will be an optimum degree of filling $Q = 83.6\%$ when the box volume $V = 1080$ mm.³, and the radius of curvature of the bubble is $r_7 = 14.4$ mm. at a focal length $f_7 = 41$ mm. whose enlargement $\beta = 1.4$ will be practically constant within the above indicated temperature range.

What I claim is:

1. In an optical observation instrument of the type comprising a telescopic sight and a reading microscope, respectively, an axially adjustable objective having its axis arranged substantially horizontally, a pentaprism disposed adjacent to one end of said objective, a box level arranged above said pentaprism and below a second prism which latter projects an image of a target point passing through said objective, pentaprism and box level substantially horizontally onto a reticle arranged between said second prism and an ocular, said box level causing an automatic compensation of small inclinations, said box level comprising a closed chamber and mounted entirely within said instrument, said chamber being filled with a predetermined amount of liquid so as to form a bubble which is arranged in the optical path of the rays of the instrument to serve as an additional lens, said bubble remaining practically unchanged in size within a temperature range from about $-10°$ C. to $+40°$ C.

2. In an optical observation instrument of the type comprising a telescopic sight and a reading microscope, respectively, an axially adjustable objective having its axis arranged substantially horizontally, a pentaprism disposed adjacent to one end of said objective, a box level arranged above said pentaprism and below a second prism which latter projects an image of a target point passing through said objective, pentaprism and box level substantially horizontally onto a reticle arranged between said second prism and an ocular, said box level causing an automatic compensation of small inclinations, said box level comprising a closed chamber and mounted entirely within said instrument, said chamber being filled with a predetermined amount of liquid so as to form a bubble which is arranged in the optical path of the rays of the instrument to serve as an additional lens, said bubble remaining practically unchanged in size within a temperature range from about $-10°$ C. to $+40°$ C., said instrument having the following data:

$V = 1080$ mm.³,
$r = 400$ mm.,
$f_1 = 112$ mm.,
$w = 16.4$ mm., and
$n_7 = 1.35$, when the bubble box is filled to 83.6% of its capacity with liquid, and wherein $V$ denotes the entire capacity of the closed chamber, $r$ denotes the radius of curvature of the runway of the bubble, $f_1$ denotes the focal length of the objective of the instrument, $w$ denotes the distance of the light admitting face of the bubble from the image plane at the reticle, and $n_7$ denotes the refractive index of the liquid in the level.

References Cited

UNITED STATES PATENTS

| | | | |
|---|---|---|---|
| 1,063,761 | 6/1913 | Aldis | 88—1 |
| 1,902,387 | 3/1933 | Von Hofe et al. | 350—179 X |

DAVID H. RUBIN, *Primary Examiner.*

P. R. MILLER, *Assistant Examiner.*